(No Model.) 2 Sheets—Sheet 1.

I. B. JONES.
MECHANISM FOR PROPELLING VEHICLES.

No. 473,843. Patented Apr. 26, 1892.

WITNESSES: Chas. Niola. C. Sedgwick.

INVENTOR: I. B. Jones
BY Munn & Co.
ATTORNEYS (No Model.) 2 Sheets—Sheet 2.
I. B. JONES.
MECHANISM FOR PROPELLING VEHICLES.
No. 473,843. Patented Apr. 26, 1892.
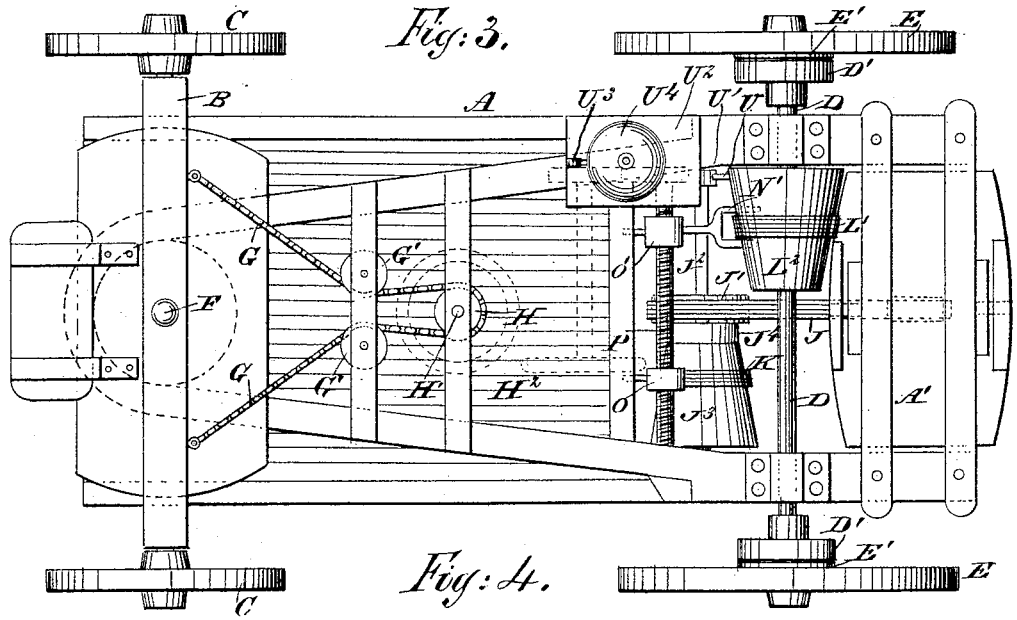
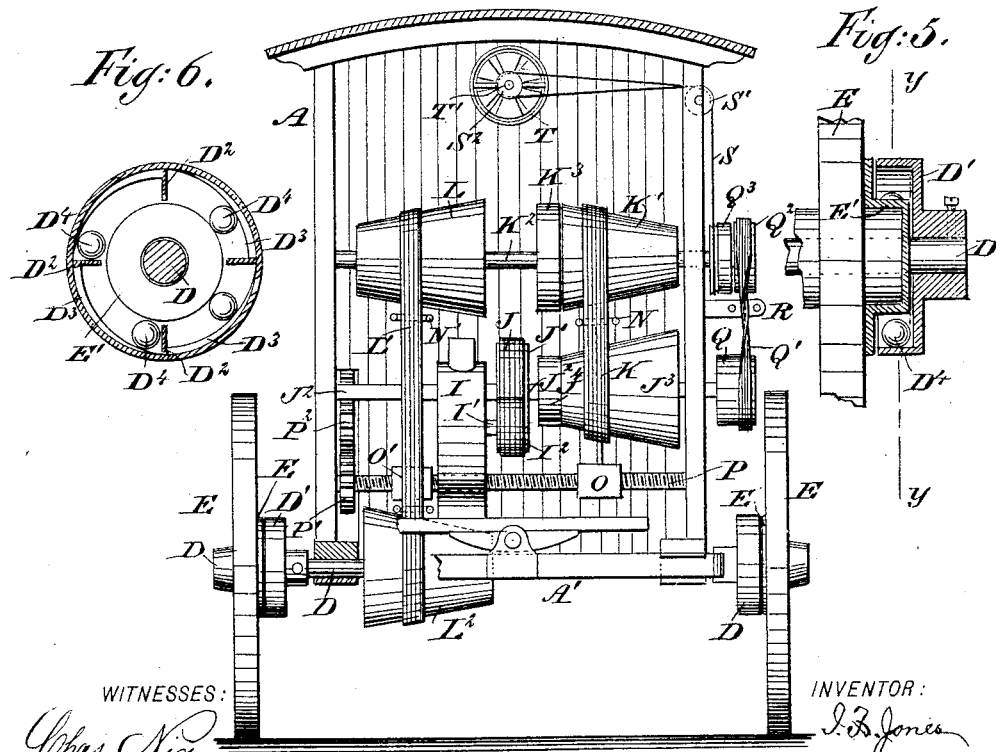
WITNESSES:
Chas. Nida
C. Sedgwick
INVENTOR:
I. B. Jones
BY Munn & Co.
ATTORNEYS

UNITED STATES PATENT OFFICE.

ISAAC B. JONES, OF XENIA, OHIO, ASSIGNOR TO HIMSELF AND ROBERT E. RICHARDSON, OF SAME PLACE.

MECHANISM FOR PROPELLING VEHICLES.

SPECIFICATION forming part of Letters Patent No. 473,843, dated April 26, 1892.

Application filed July 13, 1891. Serial No. 399,328. (No model.)

*To all whom it may concern:*

Be it known that I, ISAAC B. JONES, of Xenia, in the county of Greene and State of Ohio, have invented a new and Improved Mechanism for Propelling Vehicles, of which the following is a full, clear, and exact description.

The object of the invention is to provide a new and improved mechanism for propelling vehicles over roads, and which is simple and durable in construction, permits of readily changing the speed of the vehicle without changing the speed of the motor, and arranged for conveniently running and steering the vehicle in any desired direction.

The invention also consists of certain parts and details and combinations of the same, as will be hereinafter described, and then pointed out in the claims.

Reference is to be had to the accompanying drawings, forming a part of this specification, in which similar letters of reference indicate corresponding parts in all the figures.

Figure 1:
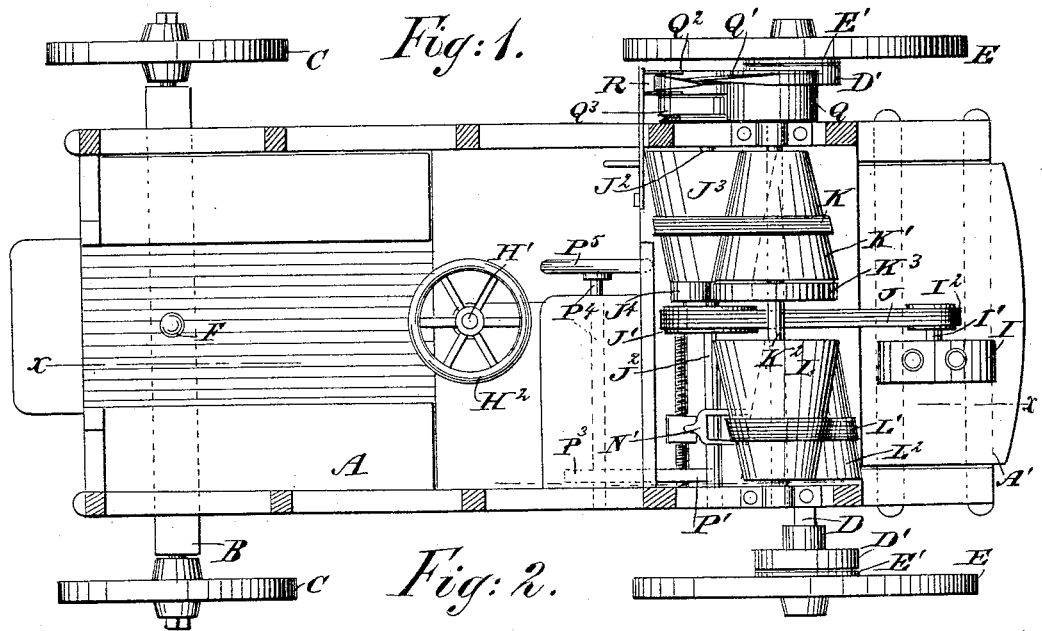
Figure 2:
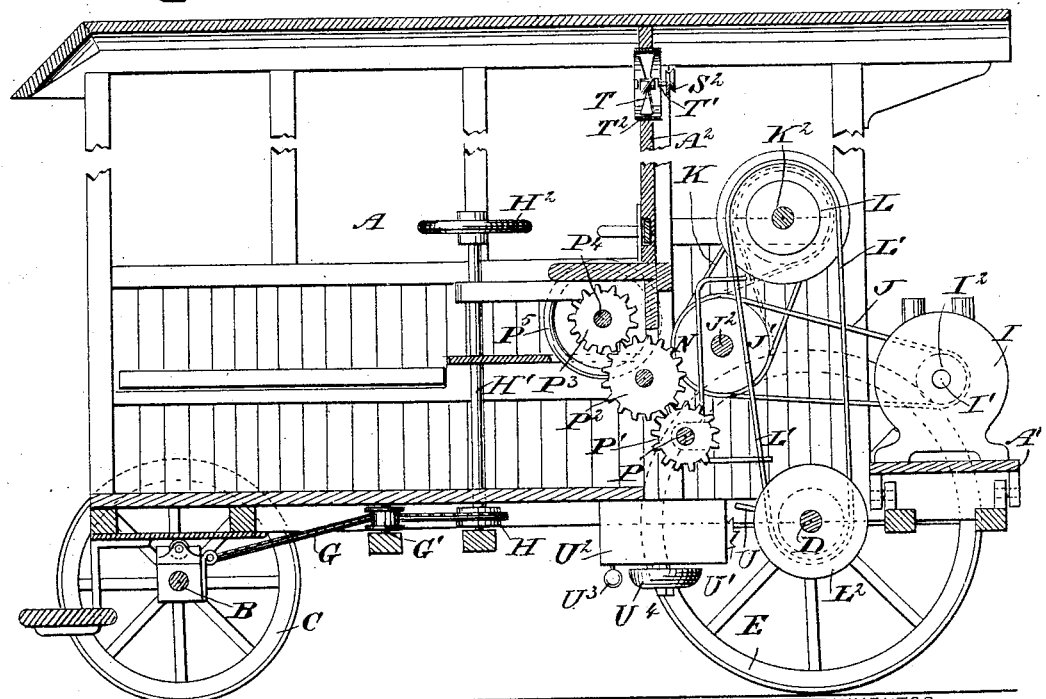

Figure 1 is a plan view of the improvement with parts in section. Fig. 2 is a sectional side elevation of the same on the line $x\ x$ in Fig. 1. Fig. 3 is an inverted plan view of the same. Fig. 4 is a rear end view of the same with parts in section and parts broken out. Fig. 5 is an enlarged section of one of the rear wheels and its connection with the axle, and Fig. 6 is a sectional front view of the same on the line $y\ y$ of Fig. 5.

The vehicle provided with my improved mechanism for propelling it is provided with a suitable covered body A, carrying on its front end the axle B, supporting the front wheels C, and provided at its rear end with the axle D, carrying the rear driving-wheels E. The connection between the rear axle D and wheels E is preferably arranged as shown in detail in Figs. 5 and 6, each axle-end carrying a box D' formed with short radial ribs $D^2$, and curved offsets $D^3$ on the inside of the rim of the box. The latter carries between two adjacent ribs a ball $D^4$, traveling on the hub E' of the wheel E, so that when the vehicle moves forward the balls travel to the thicker end of the offsets $D^3$ and are clamped between the latter and the hub, whereby the axle is clamped to the wheel and rotates with the latter.

When the vehicle moves backward, the wheels E travel in an opposite direction and the balls $D^4$ move in the larger space at the thinner end of the offsets $D^3$, and hence the wheels revolve without causing the axle to revolve, as the balls do not clamp the boxes to the hubs.

The front axle B is connected by a king-bolt F with the vehicle-body, while the rear axle D is journaled in suitable bearings on the said body A. The front axle B is connected at opposite sides of the king-bolt F with the ends of a chain or rope G, extending rearwardly and passing over idlers G' and around a pulley H, secured on the lower end of a shaft H', extending vertically through the bottom of the vehicle-body into the latter, as plainly shown in Fig. 2.

The upper end of the shaft H' carries a hand-wheel $H^2$ to enable the operator to conveniently turn the said shaft H' in order to change the direction of the vehicle-body whenever desired. It is understood that by turning the shaft H' the rope G is caused to travel on the pulley H, so that the front axle B is thrown into an angular position relative to the longitudinal axis of the vehicle, in order to turn around to the right or left, according to the direction in which the hand-wheel $H^2$ is turned. The seats in the vehicle-body A are preferably arranged lengthwise, as plainly illustrated in Figs. 1 and 2; but the said seats may be arranged transversely, if desired.

On the rear end of the vehicle-body A is pivoted a platform A', carrying a motor I, of any approved construction, and provided with a driving-shaft I', carrying a pulley $I^2$, over which passes a belt J, also passing over a pulley J', secured on a transversely-extending shaft $J^2$, mounted to turn in suitable bearings in the rear part of the vehicle-body A. On the shaft $J^2$ is secured a cone-pulley $J^3$, engaged by a belt K, passing over a similar cone-pulley K', fastened on a shaft $K^2$, extending transversely and journaled in the body A. On the shafts $J^2$ and $K^2$ are also held loose pulleys $J^4$ and $K^3$, respectively, onto which the belt K may be shifted to stop the vehicle without stopping the motor. On the shaft $K^2$ is also secured a second cone-pulley L, over which passes a belt $L'$, also passing over a like cone-pulley $L^2$, fastened on the rear axle D. The sets of cone-pulleys $J^3 K'$ and $L L^2$ are arranged as shown—that is, the apex of one cone-pulley is opposite the base of the other cone-pulley with which it is connected by the respective belt. The belts K and $L'$ are adapted to be shifted simultaneously on their respective sets of cone-pulleys by means of shifting-forks N and $N'$, respectively mounted to travel transversely and secured on nuts O and $O'$, respectively engaged by a screw-rod P, mounted to turn in suitable bearings on the vehicle-body A. On the screw-rod P is secured a gear-wheel $P'$, in mesh with an intermediate gear-wheel $P^2$, meshing into a gear-wheel $P^3$, secured on a shaft $P^4$, mounted to turn in bearings on the body A and arranged transversely, as plainly shown in the drawings.

On the inner end of the shaft $P^4$ is arranged a hand-wheel $P^5$, located within convenient reach of the operator, so that the said shaft $P^4$ can be turned to rotate the gear-wheels $P^3$, $P^2$, and $P'$, so as to impart a rotary motion to the screw-rod P, which latter causes the nuts O and $O'$ to travel laterally to shift the belts K and $L'$ simultaneously from the small ends of the pulleys $K'$ and L, respectively, to the large ends of the same, or vice versa, a reverse movement of the said belts taking place on the pulleys $J^4$ and $K^3$, respectively. When the belt K or $L'$ is at the large end of the respective cone-pulley $K'$ or L, the speed of the vehicle is increased, and when the said belts are shifted to the small ends of the said pulleys then the speed of the vehicle is diminished.

On one outer end of the shaft $J^2$ is secured a pulley Q, over which passes a crossed belt $Q'$, also passing over a pulley $Q^2$, held loosely on the shaft $K^2$. A shifting-fork R, under the control of the operator, serves to shift the belt from the loose pulley $Q^2$ onto a pulley $Q^3$, secured on the shaft $K^2$ to rotate the latter in an opposite direction to reverse the movement of the vehicle. This shifting of the belt only takes place at the time the belt K is on the loose pulleys $J^4 K^3$ above described. The fast pulley $Q^3$ is formed in its rim with a groove, over which passes a belt S, extending upward and passing over an idler $S'$ to a pulley $S^2$, secured on the shaft $T'$ of a fan-wheel T, arranged in a casing $T^2$, secured in the cross-partition or back $A^2$ of the body A. Thus when the vehicle is propelled from the motor I and the means above described the fan-wheel T is set in motion, thus ventilating the body A and cooling the occupants of the vehicle. On the cone-pulley $L^2$ is secured a radial pin U, adapted to engage at every revolution of the said pulley or its axle D a ratchet-wheel $U'$ of a registering device $U^2$, of any approved construction and serving to register the number of miles traveled. The registering device also actuates a striker $U^3$, adapted to sound a bell $U^4$ at the end of each mile made.

The operation is as follows: The passengers to be carried by the vehicle are seated on the seats in the front part of the vehicle-body A, the driver's seat being somewhat elevated and near the middle part of the vehicle-body, so as to be within convenient reach of the hand-wheel $P^5$ and the shifting-fork R. Now when the motor I is set in motion a rotary motion is imparted to the shaft $J^2$, as previously described, the said shaft $J^2$ transmitting its rotary motion to the shaft $K^2$ in the manner above set forth. The rotary motion of the shaft $K^2$ is transmitted by the cone-pulley L, belt $L'$, and cone-pulley $L^2$ to the rear axle D, so that the wheels E are caused to travel on the ground in a forward or backward direction, according to the position of the shifting-fork R and the belt K. When the operator desires to increase the speed of the vehicle, he turns the hand-wheel $P^5$ so as to shift the belts $L'$ and K toward the large ends of the cone-pulleys L and $K'$, and when it is desired to diminish the speed of the vehicle the hand-wheel $P^5$ is turned in an opposite direction to move the said belts toward the small ends of the said cone-pulleys.

When the operator desires to turn the vehicle to either the right or left, he turns the hand-wheel $H^2$ accordingly, so that the front axle B assumes an inclined position relative to the longitudinal axis of the vehicle-body, so that the direction of the vehicle is changed either to the right or left, as above described.

Having thus fully described my invention, I claim as new and desire to secure by Letters Patent—

1. In a mechanism for propelling vehicles, the combination, with a shaft adapted to be driven in either direction from a motor located on the vehicle-body, of a cone-pulley held on the said shaft, a belt passing over the said cone-pulley, a second cone-pulley secured on the axle of the vehicle, and a shifting mechanism for shifting the said belt on the said cone-pulleys, the said shifting mechanism comprising a fork engaging the belt, a nut carrying the said fork, and a screw-rod mounted to turn and engaging the said nuts to shift the latter laterally, substantially as shown and described.

2. In a mechanism for propelling vehicles, the combination, with a shaft adapted to be driven in either direction from a motor located on the vehicle-body, of a cone-pulley held on the said shaft, a belt passing over the said cone-pulley, a second cone-pulley secured on the axle of the vehicle, a shifting mechanism for shifting the said belt on the said cone-pulleys, the said shifting mechanism comprising a fork engaging the belt, a nut carrying the said fork, a screw-rod mounted to turn and engaging the said nut to shift the latter laterally, and means for revolving the said screw-rod, substantially as shown and described.

3. In a mechanism for propelling vehicles, the combination, with a motor held on the vehicle-body, of a cone-pulley adapted to be driven from the said motor, a belt passing over the said cone-pulley, and a second cone-pulley held on the axle of the vehicle and over which passes the said belt, and means for reversing the motion of the said first-named cone-pulley, substantially as shown and described.

4. In a mechanism for propelling vehicles, the combination, with a motor, of a shaft driven from the said motor, a second shaft connected by crossed belt and pulleys with the first-named shaft, a cone-pulley secured on the said second shaft, a belt passing over the said cone-pulley, and a second cone-pulley secured on the axle of the vehicle and over which passes the last-mentioned belt, substantially as shown and described.

5. In a mechanism for propelling vehicles, the combination, with a motor held on the vehicle-body, of a cone-pulley adapted to be driven from the said motor, a belt passing over the said cone-pulley, a second cone-pulley held on the axle of the vehicle and over which passes the said belt, and a recording mechanism and sounder actuated from the said second cone-pulley, substantially as shown and described.

ISAAC B. JONES.

Witnesses:
R. E. RICHARDSON,
JAMES H. MATTHEWS.